3,584,025
HYDROCARBON GELS

Frederick C. Boye, Marcellus, Chao-Shing Cheng, Williamsville, Francis E. Evans, Hamburg, and Cecil A. Friedman, Buffalo, N.Y., assignors to Allied Chemical Corporation, New York, N.Y.
No Drawing. Filed Aug. 30, 1968, Ser. No. 756,353
Int. Cl. C07d 103/04; C07f 7/04, 7/18
U.S. Cl. 260—448R       5 Claims

ABSTRACT OF THE DISCLOSURE

Gelled hydrocarbon compositions are provided by incorporation of a polyvalent metal acid salt of alkyl or alkenyl substituted succinic acid as a gelling agent.

---

Gelling agents, such as aluminum soaps, are employed in the preparation of incendiary oils, frequently referred to as "jellied gasoline" for military uses. Gelation of the petroleum base helps to confine the burning material to the target area. Recently it has been proposed to use gelling agents in the preparation of gelled fuels for jet aircraft. In this case, tests have indicated that the use of gelled fuels can reduce fire hazards in aircraft accidents by reducing the tendency of the fuel to splash or spill and then to spread fire.

It is especially desirable that gelling agents for such purposes provide a relatively uniform control of gel consistency in order that it may be readily reproducible from batch to batch. It is further desirable that the gel can be easily prepared by simple mixing of a hydrocarbon gel base with the gelling agent without the need for heating or the addition of other additives to cause gelation to occur, and that it remain stable in storage at varying temperatures so that it may be used in any climate.

A class of gelling agents have been developed which have been used successfully in the gelling of gasoline and other hydrocarbons. The more successful thickening agents of this class are aluminum soaps of fatty acids as exemplified in U.S. Pats. 2,606,107, 2,795,492 etc. Unfortunately, this class of thickening agent and the gels formed therewith are not ideal in that they do not have the desired stability as to their consistency. The gels tend to liquefy or separate out on slight increases in their moisture content and thicken when chilled or become more mobile when heated. Moreover, in many instances heat is required to effect gelation and, with other gelling agents, excessive amounts of the thickening agent are required to produce the desired viscosity.

In accordance with the present invention, it has been found that liquid hydrocarbons may be gelled quickly and easily to a desired consistency by merely mixing the hydrocarbon with a gel-forming amount of a novel partially neutralized acid salt of an alkyl or alkenyl substituted succinic acid of the formula:

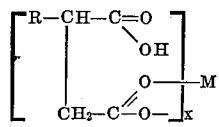

wherein R is a hydrocarbon alkyl or alkenyl group of 6 to 20 carbon atoms, preferably 10 to 14 carbon atoms; M is aluminum or magnesium; and $x$ is an integer of 2 or 3 and is equal to the valence of M. Illustrative compounds of the present invention include aluminum tris (acid dodecenylsuccinate)
aluminum tris (acid hexenylsuccinate)
aluminum tris (acid octadecylsuccinate)
aluminum tris (acid octylsuccinate)
aluminum tris (acid dodecylsuccinate)
aluminum tris (acid heptylsuccinate)
aluminum tris (acid eicosenylsuccinate)
aluminum tris (acid pentadecylsuccinate)
aluminum tris (acid octadecenylsuccinate)
aluminum tris (acid nonenylsuccinate)
magnesium di (acid eicosylsuccinate)
magnesium di (acid dodecenylsuccinate)
magnesium di (acid pentadecenylsuccinate)
magnesium di (acid hexenylsuccinate)
magnesium di (acid decenylsuccinate)
magnesium di (acid octylsuccinate)
magnesium di (acid hexylsuccinate)
magnesium di (acid octadecenylsuccinate)
magnesium di (acid eicosenylsuccinate)
magnesium di (acid heptylsuccinate).

The novel compounds of the present invention provide several important advantages over prior art thickening agents. Firstly, the compounds of the present invention provide excellent and reproducible control of gel consistency from batch to batch for a given hydrocarbon base and a given metal salt. In addition, in contrast to prior art compounds, the compounds of the present invention may be used in the formulation of gels without the hazard and inconvenience of heating. Furthermore, in preparation of certain known gels, it has been necessary to add a peptizing agent such as 2-ethylhexoic acid to assist in gel formation, thereby causing the final product to contain a large amount of peptizing agent. In contrast, when the compounds of the present invention are employed, as thickening agents, gel formation occurs readily without the need for the addition of a peptizing agent or other agent to aid gel formation. Moreover, the consistency of the gels formed employing the instant thickening agents remain stable on storage and do not liquefy or separate out when exposed to temperature changes.

The compounds of the present invention are conveniently prepared by reacting one mol of alkyl or alkenyl substituted succinic acid or anhydride with about one mol of an alkali, such as sodium hydroxide, in an aqueous reaction medium and then reacting the resultant acid akali salt with a sufficient amount of a water-soluble salt of the polyvalent metal to replace the alkali cation and form the desired partially neutralized polyvalent metal acid salt. Various salts of aluminum and magnesium, such as the chlorides, hydroxides, sulfates, nitrates, and the like may be employed to provide the desired cation. The amount of water-soluble polyvalent metal salt which is added to the reaction mixture will depend on the valence of the metal cation. Thus, when the metal is magnesium, the amount of salt should be sufficient to provide about 0.5 mol of the metal cation and when the metal is aluminum, the amount of salt should be sufficient to provide about 0.33 mol of the metal cation per mol of the substituted succinic acid or anhydride.

The substituted succinic anhydrides and acids which may be employed as starting materials in the preparation of the thickening agents of the present invention are of the general formulas:

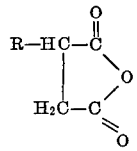

and

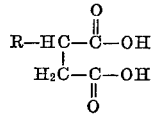

where R is a hydrocarbon alkyl or alkenyl of from 6 to 20 carbon atoms, inclusive. Suitable compounds include, for example, those wherein the hydrocarbon radical is hexenyl, octenyl, nonenyl, decenyl, dodecenyl, pentadecenyl, octadecenyl, eicosenyl, hexyl, heptyl, octyl, decyl, dodecyl, pentadecyl, octadecyl, eicosyl and the like. Mixtures of such compounds are contemplated also.

The alkenyl succinic anhydrides are preferred and can be prepared by methods well known in the art. The most feasible method is by condensing an olefin of the desired molecular weight with maleic anhydride. The alkyl succinic anhydrides can be prepared by hydrogenation of the corresponding alkenyl compound, for example in the manner described by Bailey and Klein in the Journal of the American Chemical Society, vol. 79 (1957) pp. 3124–7. The reference describes the hydrogenation of commercially available octenyl succinic anhydride in the present of a nickel catalyst to obtain octylsuccinic anhydride. In either case the corresponding acid can be prepared by hydrolysis of the anhydride.

In the preparation of gels in accordance with the invention, the gelling agent as described above, is merely incorporated in the hydrocarbon base. Various methods of incorporating the thickening agent may be employed. In the preferred method, the gelling agent is merely added to the hydrocarbon base at room temperature with simple mixing by conventional means. The amount of gelling agent used in forming the hydrocarbon gels is not critical and may vary considerably depending upon the particular hydrocarbon employed and the degree of gelation desired. Generally, satisfactory gelatin is achieved when the amount of gelling agent is between 0.5 to 20 percent, or more, based on the weight of the hydrocarbon. Preferred amounts of gelling agent range between about 1.0 and 12.0 percent, based on the weight of the hydrocarbon.

The hydrocarbon bases which may be used in accordance with this invention include any normally liquid hydrocarbon and are well known. They include as the most important and desirable class, low molecular weight aryl and alkyl hydrocarbons, principally the petroleum distillate fuel fractions, i.e. gasoline, naphtha, kerosene and the like. Instead of mixed hydrocarbons of the type just described, pure hydrocarbons such as hexane, cyclohexane, methyl cyclohexane, heptane, diisobutylene, cyclohexene, octene-1, octane, 2-ethyl hexane, trimethyl pentane, nonene-1, nonone, decane, decene, dodecane, dodecene cetane, cetene and the various known isomers and mixtures of the foregoing saturated and/or unsaturated aliphatic hydrocarbons, may be used. Of the aromatic hydrocarbons there may be used benzene, toluene, xylene and the like. It is preferred to employ hydrocarbons of the aliphatic, aromatic or mixed alphatic-aromatic type, which materials have boiling points within the range of those compounds ordinarily used for fuel purposes, and more particularly within the range of from about 100° F. up to about 400° F. For most purposes, the preferred hydrocarbon will be gasoline.

To further illustrate the present invention and the manner in which it may be practiced, the following specific examples are set forth. In the examples, unless otherwise indicated, all parts are by weight and all temperatures are in centigrade degrees.

EXAMPLE 1

Sodium hydroxide (20 parts) and dodecenyl succinic anhydride (133 parts) were added to 500 parts of water. The mixture was heated to about 50 degrees and maintained thereat for about two hours, to effect hydrolysis of the anhydride and formation of the acid sodium salt. The reaction mixture was then cooled to about 40 degrees at which point the acid sodium salt separated. Ethyl alcohol (237 parts) was added to solubilize the mixture. Next, a solution of 56 parts of $Al_2(SO_4)_3 \cdot 18H_2O$ in about 150 parts of water, was added slowly at room temperature (about 20 degrees). The aluminum tris (acid dodecenylsuccinate) separated as white crystals and was filtered, washed with water and dried at 70 degrees.

In a similar manner, when dodecylsuccinic anhydride was substituted for the dodecenylsuccinic anhydride in the foregoing example, the analogous alkyl acid salt, namely aluminum tris (acid dodecylsuccinate) was prepared.

EXAMPLE 2

One hundred and thirty-three parts of dodecenyl succinic anhydride was added to a solution of 500 parts of water and 39.5 parts of 50 degree Baumé sodium hydroxide. The moisture was heated to and maintained at 60 to 70 degrees to hydrolyze the anhydride, form the acid sodium salt and then cooled to room temperature (about 20 degrees). Ethyl alcohol (237 parts) was added to solubilize the mixture. A solution of 62.5 parts of magnesium sulfate in 200 parts of water was added, and the resultant slurry was diluted by the addition of 500 parts of water. The solids were then allowed to settle, forming a gel-like mass and the bulk of the water was removed by decantation. The gel-like mass of magnesium di(acid dodecenyl succinate) was then washed with water and again separated by decantation. The mass was then slurried with 396 parts of acetone and decanted, washed with additional acetone and decanted, then heated at 70 degrees at a pressure of about 20 millimeters of mercury to form a dry mass of crystals of magnesium di(acid dodecenylsuccinate).

EXAMPLE 3

To demonstrate the gelling properties of the compounds of the present invention a series of gels were prepared by simple mixing at room temperature (20 degrees) of various amounts of aluminum tris(acid dodecenylsuccinate) thickening agent prepared as in Example 1, with n-heptane. It was found that gelation occurs within 20 minutes and the gel reaches a maximum consistency within a few hours. Various concentrations of the thickening agent were added to the n-heptane and the consistency of the gel was observed after about 4–6 hours. All of the gels thus prepared were clear and exhibited excellent storage stability over a period of several months and the results were reproducible on subsequent trials.

| Amount of aluminum tris(acid dodecenylsuccinate, in percent by weight based on the weight of n-heptane): | State of gelation after 4–6 hours |
|---|---|
| 2 | Thin gel; pourable at room temperature. |
| 4 | Noticeably thicker gel; still pourable at room temperature. |
| 6 | Cohesive, semi-fluid state; pourable with great difficulty. |
| 10 | Elastic, cohesive mass; non-pourable. |

EXAMPLE 4

A kerosene gel was prepared as in Example 3, except that kerosene (boiling range 195–250° C.) was substituted for n-heptane and the amount of aluminum tris(acid dodecenylsuccinate) added was 5 percent by weight based on the amount of kerosene. The gel, thus prepared, was a clear cohesive, semi-fluid mass, which was pourable only with great difficulty, and exhibited excellent storage stability.

EXAMPLE 5

For comparison with a prior art gelling agent, the procedure of Example 4 was repeated except that in place of the aluminum tris(acid dodecenylsuccinate) there was substituted 5 percent by weight based on the amount of kerosene, of aluminum octoate. The aluminum octoate-kerosene mixture showed no signs of gelling after standing at room temperature (20 degrees) for about 16 hours. The mixture was then heated to 65 degrees and no gelation occurred.

We claim:
1. A compound of the formula

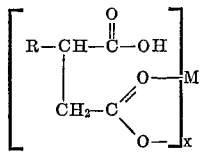

wherein R is an alkyl or alkenyl radical of from 6 to 20 carbon atoms; M is aluminum or magnesium; $x$ is 2 or 3 and is equal to the valence of M.

2. A compound as claimed in claim 1 wherein R is alkenyl.

3. A compound as claimed in claim 1 wherein R is alkyl.

4. A compound as claimed in claim 1 wherein M is aluminum.

5. A compound as claimed in claim 1 wherein M is magnesium.

References Cited
UNITED STATES PATENTS

| | | | |
|---|---|---|---|
| 2,528,373 | 10/1950 | Knowles et al. | 252—35X |
| 2,568,746 | 9/1951 | Kirkpatrick | 252—341 |
| 3,271,310 | 9/1966 | Le Suer | 260—448X |
| 3,231,587 | 1/1966 | Rense | 260—537X |

JAMES E. POER, Primary Examiner

H. M. S. SNEED, Assistant Examiner

U.S. Cl. X.R.

44—7; 260—537